US009477671B2

(12) United States Patent
Bhatti et al.

(10) Patent No.: US 9,477,671 B2
(45) Date of Patent: Oct. 25, 2016

(54) SYSTEM AND METHOD FOR IMPLEMENTING EFFECTIVE DATE CONSTRAINTS IN A ROLE HIERARCHY

(75) Inventors: Rafae Bhatti, Sunnyvale, CA (US); Janaki Narasinghanallur, San Ramon, CA (US); Thomas Keefe, Mill Valley, CA (US); Vikram Pesati, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 629 days.

(21) Appl. No.: 12/473,164

(22) Filed: May 27, 2009

(65) Prior Publication Data
US 2010/0306268 A1 Dec. 2, 2010

(51) Int. Cl.
G06F 17/30 (2006.01)
G06F 21/62 (2013.01)
G06F 21/60 (2013.01)

(52) U.S. Cl.
CPC ... *G06F 17/30091* (2013.01); *G06F 17/30165* (2013.01); *G06F 17/30171* (2013.01); *G06F 21/604* (2013.01); *G06F 21/6209* (2013.01)

(58) Field of Classification Search
CPC .............. G06F 21/604; G06F 21/6209; G06F 17/30091; G06F 17/30165; G06F 17/30171
USPC ................. 707/781, 784, 786, 787, 999.009; 726/1, 2, 3, 4, 5, 6, 7, 8, 28
See application file for complete search history.

(56) References Cited

U.S. PATENT DOCUMENTS 5,450,593 A * 9/1995 Howell et al. ................. 726/21
5,911,143 A * 6/1999 Deinhart et al.
6,058,389 A * 5/2000 Chandra et al.
6,449,651 B1 * 9/2002 Dorfman et al. ............. 709/229
6,516,315 B1 * 2/2003 Gupta
6,574,736 B1 * 6/2003 Andrews ................. G06F 9/468
　　　　　　　　　　　　　　　　　　　707/999.1
7,051,212 B2 * 5/2006 Ginter et al. .................. 713/193
7,058,630 B2 * 6/2006 Houston et al. ............. 707/787
7,340,469 B1 * 3/2008 Alghathbar et al.
7,710,999 B2 * 5/2010 Bolder et al. ................. 370/465
7,814,536 B2 * 10/2010 Martherus et al. ............... 726/8

(Continued)

OTHER PUBLICATIONS

Wikipedia, "Role-based access control" retrieved on Feb. 9, 2016.*

(Continued)

*Primary Examiner* — James Trujillo
*Assistant Examiner* — Hubert Cheung
(74) *Attorney, Agent, or Firm* — Hickman Palermo Becker Bingham LLP

(57) ABSTRACT

A system providing a method for implementing effective date constraints in a role hierarchy is described. In one embodiment, for example, the method comprises the steps of: storing data that represents a first effective date constraint on a role of a role hierarchy, the first effective date constraint having a start date and an end date; storing data in a database that represents a second effective date constraint on a grant of the role to a grantee, the second effective date constraint having a start date and an end date; storing data in a database that represents a third effective date constraint on the grantee, the third effective date constraint having a start date and an end date; and computing a net effective date constraint for the role by computing the intersection of the first effective date constraint, the second effective date constraint, and the third effective date constraint.

42 Claims, 9 Drawing Sheets

(56) References Cited

U.S. PATENT DOCUMENTS

| | | | |
|---|---|---|---|
| 8,745,087 B2* | 6/2014 | Daily | G06F 21/6218 707/781 |
| 2006/0047657 A1* | 3/2006 | Frieder et al. | 707/9 |
| 2006/0168259 A1* | 7/2006 | Spilotro | H04L 63/102 709/229 |
| 2007/0179828 A1* | 8/2007 | Elkin et al. | 705/8 |
| 2008/0016580 A1* | 1/2008 | Dixit et al. | 726/27 |
| 2008/0028069 A1* | 1/2008 | Urbanek et al. | 709/224 |
| 2008/0134320 A1* | 6/2008 | Desai et al. | 726/21 |
| 2009/0178102 A1* | 7/2009 | Alghathbar et al. | 726/1 |
| 2009/0320035 A1* | 12/2009 | Ahlgren | G06F 9/468 718/104 |
| 2010/0250603 A1* | 9/2010 | Balakrishnaiah et al. | 707/781 |

OTHER PUBLICATIONS

J. Barkley, "Comparing Simple Role Based Access Control Models and Access Control Lists," Proceedings of the Second ACM Workshop on Role-Based Access Control, pp. 127-132, published on Aug. 11, 1997.*

Oasis, "eXtensible Access Control Markup Language (XACML) Version 2.0", Oasis Standard, Feb. 2005, 141 pages.

Oasis, "XML Digital Signature profile of XACML v2.0", Oasis Standard, Feb. 2005, 8 pages.

Oasis, "Hierarchical resource profile of XACML v2.0", Oasis Standard, Feb. 2005, 18 pages.

Oasis, "Multiple resource profile of XACML v2.0", Oasis Standard, Feb. 2005, 14 pages.

Oasis, "Privacy policy profile of XACML v2.0", Oasis Standard, Feb. 2005, 7 pages.

Oasis, "Core and hierarchical role based access control (RBAC) profile of XACML v2.0", Oasis Standard, Feb. 2005, 23 pages.

Oasis, "SAML 2.0 profile of XACML v2.0", Oasis Standard, Feb. 2005, 21 pages.

Email From the Inventor Rafae Bhatti Sent Jul. 20, 2009, 1 page.

American National Standards Institue Inc, "Incits, Rose Based Access Control", Information Technology Industry Council, Feb. 2004, 56 pages.

* cited by examiner

SYSTEM AND METHOD FOR IMPLEMENTING EFFECTIVE DATE CONSTRAINTS IN A ROLE HIERARCHY

BACKGROUND

1. Technical Field

The present invention relates generally to data processing and, more particularly, to techniques in a data processor for implementing effective date constraints in a role hierarchy.

2. Background Art

Computers are used to store and manage many types of data. Sensitive data is a common form of data that computer systems store and manage. Sensitive data refers broadly to any data that represents non-public information that might adversely affect the privacy or security of a person or organization if revealed to persons who should not be trusted with the information.

Increasingly, businesses and organizations are using role-based access control to control access to sensitive data managed by computer systems. In role-based access control, privileges to perform operations are assigned to roles, and users acquire privileges through the roles to which they are assigned. Because users are not assigned privileges directly, but instead acquire privileges through the roles to which they are assigned, management of individual user privileges is simplified. For example, management of individual user rights is a matter of assigning appropriate roles to the user.

When used to enforce role-based access control, computers are typically deployed in either a two-tier client/server environment or in a three-tier client/server architecture. In a two-tier client/server environment, a client process receives a data access command (e.g., a database query) from a user and connects directly to a server process. In such two-tier architectures, the server process is capable of executing the user's data access command directly against stored sensitive data. In a three-tier client/server architecture, the client process is indirectly connected to the server process through one or more application processes. In such three-tier architectures, an application process submits data access commands to the server process on the user's behalf.

In either case, whether a user's client process is connected directly to a server process or connected indirectly through an application process, a multi-user computer system executing the server process typically establishes a user session for the user. A user session typically includes data that identifies a user using a multi-user computer system. For example, the data may include information such as the user's user name, a network address of the network device executing the user's client process, and other details. In addition, in multi-user systems that implement role-based access control, the session data may indicate what roles are currently active for the user. The multi-user system may use this data to enforce role-based access control policies when processing data access requests from the user.

Typically, a multi-user system establishes a user session for a user after the user successfully authenticates with the system. For example, the system might establish a user session after successfully verifying a username and password provided by the user. As part of establishing a user session, the system may read data from a database and store the data (or data derived based on data read from the database) in a memory cache where it is more quickly accessed by the system than if accessed from the actual database itself (which is typically stored on a relatively slow data storage medium such as a hard disk). For example, in a multi-user system that implements role-based access control, the system may read and process data from a database to determine a set of one or more roles that have been assigned to the authenticated user. The determined set of roles may then be stored as user session data in the memory cache. Thereafter, during the user's session, when the user requests the system to perform a data access operation that requires a privilege, the system can quickly access role information for the user that is necessary to determine whether the user has acquired the necessary privilege.

There is, however, significant computational cost to establish a user session. This cost may result from having to read data from a database. In addition, some session data, such as the set of roles assigned to a user, may have to be derived by executing an algorithm on data read from a database. Consequently, for purposes of computational efficiency, a multi-user system typically establishes a single user session that spans many user initiated data access operations. For example, the system might establish a single user session that spans the life of the connection between the user's client process and the system. The user may submit many data access commands over such a connection. As a connection may span many hours or even many days, a user's session may also span many hours or many days. The system does this in lieu of establishing a new user session each time a user submits a data access command to the system.

A multi-user system may also allow the specification of a time period during which a user's account is active. For example, a business may want to ensure that a contractor has access to sensitive data only during the contractor's contract time period. Accordingly, the contractor's user account may have an associated contract start time and a contract end time. As a user session for a user can span a significant length of time, it is possible that an effective time period associated with the user's account may expire during the user's session. However, as the calculation of user privileges is typically performed only once when the user's session is established, typical multi-user systems do not account for the effect of the passage of time on user privileges during a user's session. This is undesirable from the standpoint that a user can exercise privileges even after the time period in which the user was authorized to exercise the privileges has expired.

One solution to this is to re-establish a user's session each time the user submits a data access operation. However, as indicated previously, this solution is impractical for almost all multi-user systems because of the cost associated with establishing a user session.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Glossary

Figure 1:
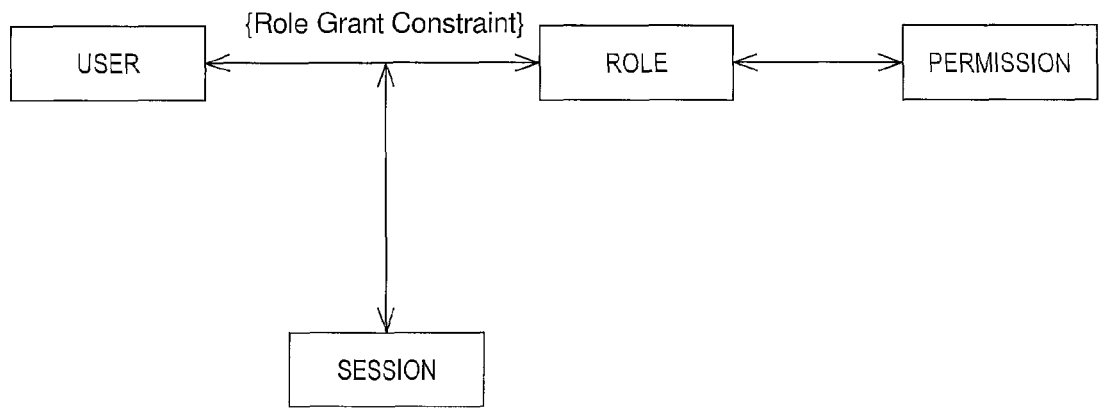
FIG. 1 is a block diagram that illustrates relationships between users, roles, permissions, and sessions.

The following definitions are provided for the purposes of explanation, not limitation, in order to aide in understanding the present invention.

RBAC→The term RBAC refers to Role Based Access Control. A RBAC model provides a level of abstraction to promote security administration at a business enterprise level rather than at the user identity level. For further description of RBAC, see e.g., "ANSI/INCITS 359-2004", an ANSI/INCITS standard dated Feb. 3, 2004, the disclosure of which is hereby incorporated by reference. A copy of the standard is available via the Internet (e.g., currently at www.incits.org).

Role→In the context of RBAC, a role is a job function within the context of an organization with some associated semantics regarding the authority and responsibility conferred on users assigned to the role.

Object→In the context of RBAC, an object is an entity that contains or receives information. For a database system that implements RBAC, an object can represent information containers (e.g., columns, rows, tables, and views within a relational database management system).

Operation→In the context of RBAC, an operation refers to computer-executable instructions, which upon invocation, executes some function for a user. For a database system that implements RBAC, an operation can represent, for example, a query against a database (e.g., a SQL query against a relational database).

Permission→In the context of RBAC, a permission is an approval to perform an operation on one or more RBAC protected objects.

Permission Assignment→In the context of RBAC, a permission assignment refers to a static assignment of a certain role to specific permission(s). A permission assignment is also referred to herein as a permission grant.

Session→In the context of multi-user systems, a session refers to data maintained by the system that uniquely identifies a current user of the system. A server system may establish a user session for a user when the user successfully authenticates with the system by proving possession of valid credentials (e.g., a valid username and password). A session, in the context of RBAC, refers to a mapping between a user and an active set of roles for the user. A session, in addition to maintaining data that uniquely identifies a user, may also maintain data that specifies the set of active roles for a user. As used herein, the term "session" is used interchangeably to refer to both a user session and an RBAC session.

User→In the context of RBAC, a user is defined as a human being, machine, network, or intelligent autonomous agent whose identity can be established by credentials (e.g., username and password).

User Assignment→In the context of RBAC, a user assignment refers to a static assignment of a certain role to specific user(s). A user assignment is also referred to herein as a role grant.

Introduction

A system providing a method for implementing effective date constraints in a role hierarchy is described.

In the following description, for the purposes of explanation, numerous specific details are set forth in order to provide a thorough understanding of the present invention. In some instances, it will be apparent, however, that the present invention may be practiced without these specific details. In other instances, well-known structures and devices are shown in block diagram form in order to avoid unnecessarily obscuring the present invention.

The present invention is illustrated by way of example, and not by way of limitation. Exemplary embodiments of the invention are primarily described with reference to block diagrams or flowcharts. With regard to the flowcharts, each block within the flowcharts represents both a method step and an element of an apparatus for performing the method step. Depending on the implementation, the corresponding apparatus element may be implemented in software, hardware, firmware, or combinations thereof.

Reference in the following description to "one embodiment" or "an embodiment" means that a particular feature, structure, or characteristic described in connection with the embodiment is included in at least one embodiment of the present invention. Further, the appearances of the phrase "in one embodiment" or "in an embodiment" in various places in the following description are not necessarily all referring to the same embodiment.

Overview of Implementing Effective Date Constraints in a Role Hierarchy

Businesses and organizations that use multi-user computer systems to manage sensitive information often desire to constrain access to sensitive information based on time. For example, a business may grant the privilege to enroll in an Employee Stock Purchase Program (ESPP) to all employees yet limit the enrollment period to between the months of April and September of each year.

Typical mechanisms in multi-user systems for enforcing time-based constraints involve a one-time check typically performed immediately after the user successfully authenticates with the system. Such systems require that the user re-authenticate with the system in order for time-based privileges to be current. This is inconvenient for the user. Further, such systems allow a user to exercise, during the remainder of the user's session, a time-based privilege that had previously expired during the session.

To address these and other needs, techniques are disclosed herein for dynamically enforcing, during a user's session, statically set time-based constraints on users, roles, and role grants. Further, the techniques may be applied to dynamically enforce statically set time-based constraints on user, roles and role grants in a role hierarchy. During a user's session, the roles granted to a user that are to become active during the session are automatically activated as and when the appropriate time arrives. Similarly, roles granted to the user that are to become inactive during the user's session are automatically deactivated as and when the appropriate time arrives.

In one embodiment, dynamic enforcement is achieved by maintaining a priority queue of roles granted to the user ordered by time for each user's session. When a user requests to perform operation on a protected object during a session, an efficient inspection of the head of the priority queue is made to determine roles granted to the user that are to be activated and roles that are to be deactivated. In one embodiment, separate queues are maintained for roles that are to become active and roles that are to become de-active.

In one embodiment, an algorithm is used to calculate effective date constraints for roles in a role hierarchy that are granted to a user. The algorithm takes into account effective date constraints statically set on users, roles, and role grants in the role hierarchy. In addition, the algorithm handles inheritance of effective date constraints within the hierarchy. In one embodiment, the calculation of a "net" effective date constraint of a role in a role hierarchy involves computing the intersection of effective date constraints of all elements in the role hierarchy along the path from the user to the role. In one embodiment, the algorithm is executed when a database session is established for a user. The results of executing the algorithm are used to populate the priority queues for the user's session with information about roles that are to-be-activated and roles that are to-be-deactivated.

In contrast, existing systems typically do not enforce data access based on date constraints placed on roles and role grants. Further, existing systems do not account for inheritance of date constraints within a role hierarchy.

With the algorithm of the present invention, inheritance of time constraints in a role hierarchy is taken into account when computing net effective date constraints for roles, so specifying time-based access control policies is simplified and more flexible than with existing systems. Rather than perform a one-time check, with the present invention, roles become active and de-active as and when the appropriate time arrives. This avoids the security vulnerability present in existing systems without requiring users to re-authenticate. The design is more secure and by allowing for extensibility of time constraints within a role hierarchy through inheritance, the present invention more effectively balances the functional and security requirements of the users and owners of multi-user systems.

Before describing the present invention in detail, some background information useful for understanding the operations of the present invention will be described.

Role Based Access Control (RBAC)

Role Based Access Control (RBAC) is a model for controlling access to data. RBAC is implemented in multi-user systems for controlling access to sensitive data. FIG. 1 is a block diagram 100 that illustrates relationships between users, roles, permissions, and sessions within RBAC.

As shown in FIG. 1, in an illustrative RBAC implementation, users are assigned to roles (role grants), permissions are assigned to roles (permission grants) and users acquire permissions during sessions by being assigned to roles. Both the role grant and permission grant can be many-to-many. Thus, the same user can be granted many roles and a single role can have many users. Similarly for permissions.

Figure 2:
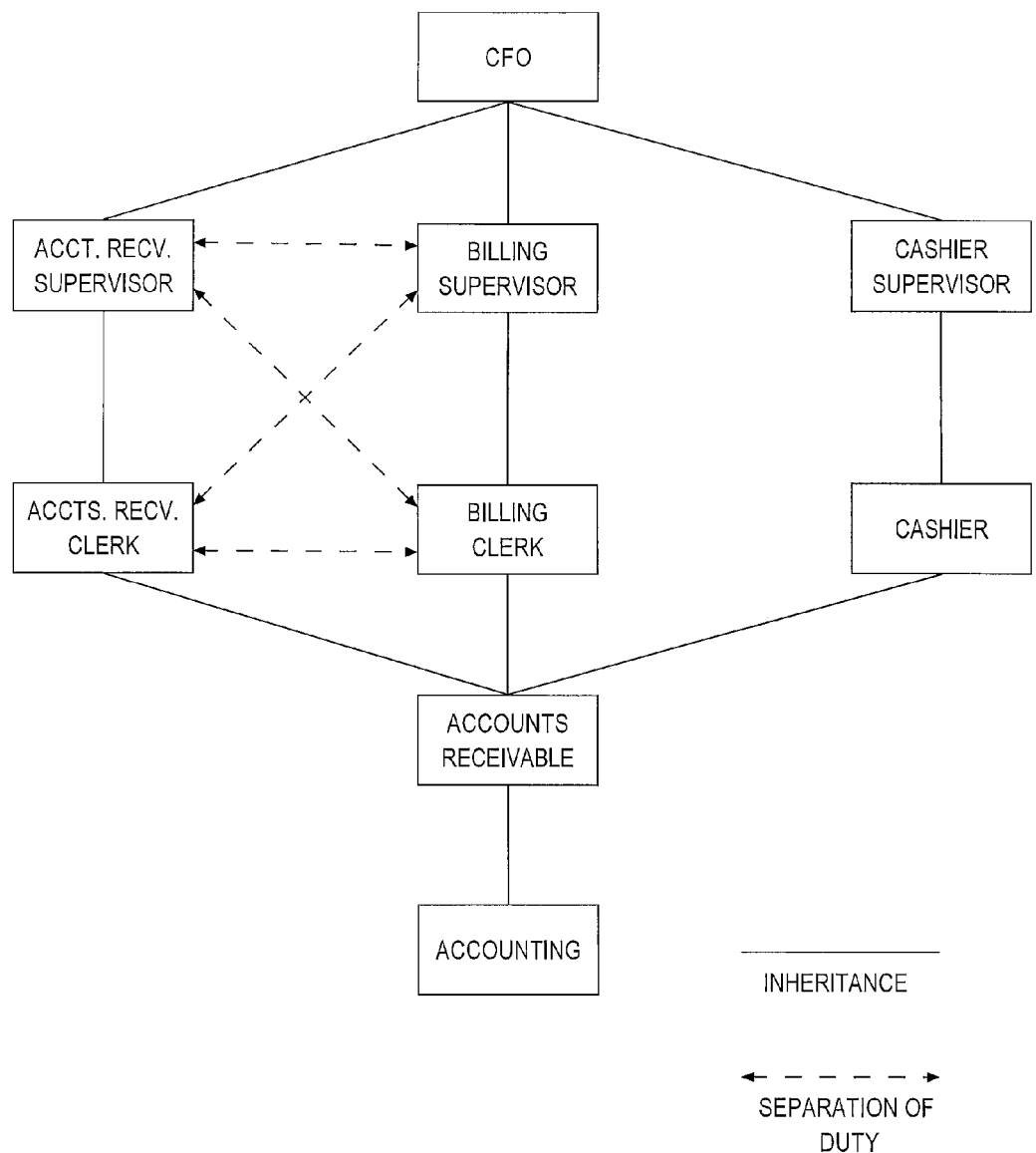
FIG. 2 is a block diagram illustrating an example role hierarchy.

Roles may be organized hierarchically (role hierarchy) to define seniority relationships between roles, whereby senior roles acquire the permissions of their juniors. FIG. 2 is a block diagram 200 illustrating a tree representation of an example role hierarchy. As shown in FIG. 2, each role in the accounting department is presented as a node in the tree. The more powerful (or senior) roles within the accounting department (e.g., chief financial officer) are shown toward the top of the role hierarchy, and the less powerful (or junior) roles (e.g., accounting) toward the bottom.

A senior role may inherit the permissions granted to junior roles. For example, referring to FIG. 2, the Billing Supervisor role may inherit the permissions granted to the Billing Clerk role, the Accounts Receivable role, and the Accounting role. A permission that is assigned directly to a role is referred to herein as a direct permission grant. A permission that is inherited by a senior role from a junior role is referred to herein as an indirect permission grant. Unless otherwise indicated, the term permission grant refers to both a direct permission grant and an indirect permission grant.

A senior role may also aggregate the permissions granted to junior roles. For example, referring to FIG. 2, the CFO role may aggregate the permissions granted to Accounts Receivable Supervisor, the Billing Supervisor, and the Cashier Supervisor.

As described previously, a user may be granted one or more roles. The roles granted to the user determine the possible set of permissions that can be acquired by the user during a session. When a user is directly assigned to a role, the assignment is referred to as a direct role grant. For a direct role grant, the user can acquire all direct and indirect permissions granted to the role. In other words, the user can acquire all permissions directly granted to the role and all permissions that the role inherits from junior roles in the role hierarchy. For example, referring to FIG. 2, a user assigned to the Cashier role could possibly acquire the permissions directly granted to the Cashier role and the permissions inherited by the Cashier role from the Accounts Receivable role and the Accounting role.

Roles from which a user can indirectly acquire permissions through inheritance are referred to herein as indirect role grants. Returning again to FIG. 2, a direct role grant of the Cashier role to a user also involves, by virtue of the role hierarchy, indirect role grants of Accounts Receivable and Accounting roles to the user.

Within a role hierarchy, role grant constraints may be placed on role grants to enforce separation of duties. Separation of duty refers to the partitioning of privileges among different roles to prevent a single user for acquiring too much privilege. For example, referring to FIG. 2, a user who is granted the role Billing Clerk may not be granted the role Accounts Receivable Clerk. To enforce a role grant constraint between Billing Clerk role and the Accounts Receivable Clerk role, a database system may prohibit a user who is currently granted the Billing Clerk role to be granted the Accounts Receivable Clerk role and vice versa.

Role grant constraints may be inherited within a role hierarchy. For example, referring to FIG. 2, if the role Accounts Receivable Supervisor inherits Accounts Receivable Clerk, and Accounts Receivable Clerk has a role grant constraint relationship with Billing Clerk, then Accounts Receivable Supervisor also has a role grant constraint relationship with Billing Clerk. Thus, if a user is currently granted the Accounts Receivable Supervisor, the user may not also be granted the Billing Supervisor role or the Billing Clerk role.

With this information in mind, various scenarios that arise by introducing time constraints in a role hierarchy will next be described.

Time Constraints on Roles in a Role Hierarchy

As described previously, effective date constraints may be applied to roles, users, and role grants in a role hierarchy. Initially, scenarios that arise by applying effective date constraints on roles in a role hierarchy will be described. Later, those scenarios will be revisited in the context of applying effective date constraints to users and role grants.

Figure 3:
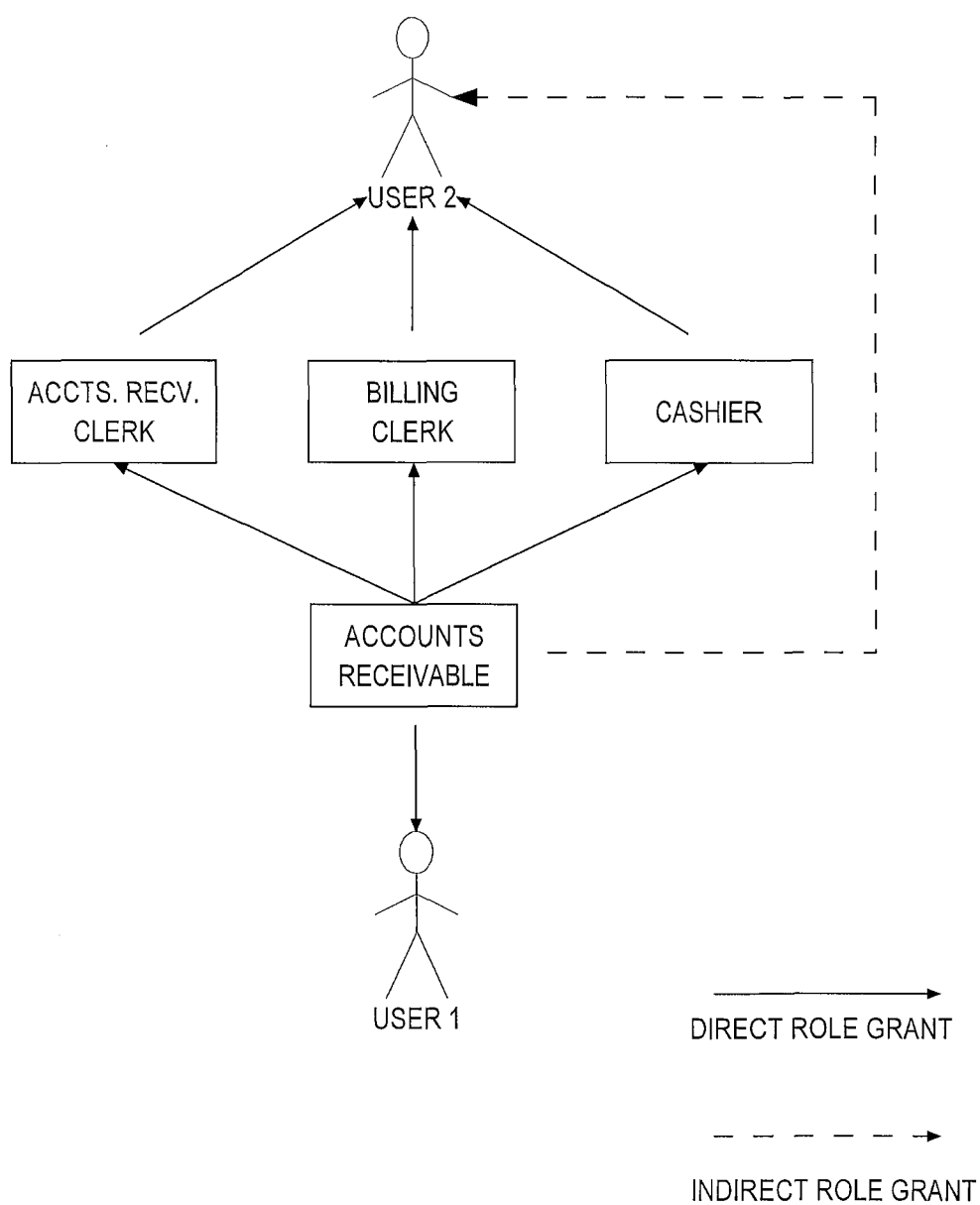
FIG. 3 is a block-diagram illustrating an example role hierarchy.

FIG. 3 is a block-diagram illustrating an example role hierarchy in which User 1 is directly granted the Accounts Receivable role and User 2 is directly granted the roles Accounts Receivable Clerk, Billing Clerk, and Cashier. The Accounts Receivable role is the junior-most role. User 2, by virtue of being directly granted roles senior to the Accounts Receivable role, is indirectly granted the Accounts Receivable role.

An effective date constraint on a role determines when the role is effective. When no effective date constraint is applied to a role, the role is effective at all times (designated as ALL in the examples below). Within the context of a user's database session, a role granted to the user may be currently active—in which case the user acquires the permissions granted to the role—or currently inactive—in which case the user does not acquire the permissions granted to the role. A role that is not currently effective cannot be currently active. Thus, a user cannot acquire the privileges granted to a role when the role is not effective.

In one embodiment, an effective date constraint has a start date and an end date. In one embodiment, an effective date constraint is designated using a Gregorian calendar date. However, it should be understood that a date designation in virtually any calendaring system may be used. A simple example of effective date constraints on the roles depicted in FIG. 3 is as follows:

TABLE 1

Effective Date Constraints on Roles

| Role: | Start Date: | End Date: |
|---|---|---|
| Accounts Receivable Clerk | Sep. 10, 2007 | Sep. 15, 2007 |
| Billing Clerk | Sep. 9, 2007 | Sep. 12, 2007 |
| Cashier | Sep. 12, 2007 | Sep. 20, 2007 |
| Accounts Receivable | ALL | ALL |

In one embodiment, four sets of roles are maintained within a user's database session: (1) the set of roles that are currently active for the user, (2) the set of roles that are currently inactive for the user, (3) the set of roles that are to-be-activated in the future, and (4) the set of roles that are to-be-deactivated in the future. As an example of the four sets of roles at various points in time using the effective date constraints on the roles of FIG. 3 provided in Table 1 above is as follows:

On Sep. 9, 2007

|  | User 1: | User 2: |
|---|---|---|
| Active: | Accounts Receivable | Billing Clerk |
|  |  | Accounts Receivable |
| To-Be-Activated: |  | Accounts Receivable Clerk |
|  |  | Cashier |
| Inactive: |  |  |
| To-Be-Deactivated: |  | Billing Clerk |
|  |  | Accounts Receivable |

On Sep. 10, 2007

|  | User 1: | User 2: |
|---|---|---|
| Active: | Accounts Receivable | Accounts Receivable Clerk |
|  |  | Billing Clerk |
|  |  | Accounts Receivable |
| To-Be-Activated: |  | Cashier |
| Inactive: |  |  |
| To-Be-Deactivated: |  | Accounts Receivable Clerk |
|  |  | Billing Clerk |
|  |  | Accounts Receivable |

On Sep. 12, 2007

|  | User 1: | User 2: |
|---|---|---|
| Active: | Accounts Receivable | Accounts Receivable Clerk |
|  |  | Cashier |
|  |  | Accounts Receivable |
| To-Be-Activated: |  |  |
| Inactive: |  |  |
| To-Be-Deactivated: |  | Accounts Receivable Clerk |
|  |  | Cashier |
|  |  | Accounts Receivable |

In one embodiment, the to-be-activated set of roles and the to-be-deactivated set of roles are maintained as separate priority queue data structures for the user's session. Roles are inserted into the to-be-activated queue in ascending order of their effective start dates and inserted into the to-be-deactivated queue in ascending order of their effective end dates. As explained in greater detail below, because a role may have different effective date constraints in the context of different user sessions, these queues are maintained separately for each user session.

Supported Scenarios for Activating Date Constrained Roles

Although embodiments of the present invention provide support for a variety of different scenarios, two representative supported scenarios will now be used for purposes of illustrating the operation of an embodiment of the present invention. It should be understood that these scenarios are provided for purposes of illustration and not limitation and that embodiments of the present invention may be used in a number of other scenarios.

As explained previously, a role granted to a user may be currently inactive or currently active at a given time within a user's session. Further, a role granted to a user may be activated by default when a session is established for the user. Alternatively, a role may require explicit activation during the user's session. Explicit activation of a role for a user may be attempted, for example, by issuing a database command to a database system within the context of the user's database session. Additionally, a role's grant type (i.e., indirect or direct) and the role's net effective date constraint affects when the role is effective, and hence, when the role can be active within the user's session.

The two representative scenarios described in the following examples are as follows:
(1) A role that is directly granted to a user can be explicitly activated during the role's effective time period regardless if any of its immediate senior roles are currently active or currently effective; and
(2) A role that is indirectly granted to a user cannot be explicitly activated even if it is currently effective. Instead, an indirectly granted role is active while it is effective and at least one immediate senior role is active.

For instance, consider the role hierarchy of FIG. 3 and the effective date constraints of Table 1 above. If User 1 attempts to activate the Accounts Receivable role before any of the Accounts Receivable Clerk, Billing Clerk, or Cashier roles are activated, then that activation will be permitted under scenario (1). The Accounts Receivable role is directly granted to User 1 and is effective at all times. Thus, under scenario (1), the Accounts Receivable role can be activated in User 1's session regardless if any of the Accounts Receivable Clerk, Billing Clerk, or Cashier roles is currently active or currently effective.

As another example, consider the case where User 2 attempts to activate the Accounts Receivable role before any of the Accounts Receivable Clerk, Billing Clerk, or Cashier roles are active. In this case, the activation will not be permitted. The Accounts Receivable role is indirectly granted to User 2 and thus cannot be explicitly activated under scenario (2).

As described previously with respect to scenario (2), a role that is indirectly granted to a user cannot be explicitly activated even if the role is currently effective. Instead, an indirectly granted role is active while it is effective and at least one immediate senior role is active. In one embodiment, an indirectly granted role inherits the effective date constraints of its senior roles and the inheritance of effective date constraints determines when the role is effective (i.e., the role's net effective date constraint).

An indirectly granted role may have multiple net effective date constraints inherited along the paths in the role hierarchy involving the indirectly granted role's immediate senior roles. When an indirectly granted role has multiple net effective date constraints, the union of the multiple net effective date constraints determines when the role is effective. The set of multiple net effective date constraints is given by $\{EDI_r \cap EDI_{p1}, EDI_r \cap EDI_{p2}, \ldots EDI_r \cap EDI_{pn}\}$, where $EDI_r$ is the effective date interval of the indirectly granted role and $EDI_{p1}, EDI_{p2}, \ldots EDI_{pn}$ are the effective date intervals along the paths in the role hierarchy involving the indirectly granted role's immediate senior roles. Each of the multiple net effective date constraints is computed separately along each of the paths using an algorithm described in greater detail below with respect to FIG. 4.

Returning to the example role hierarchy of FIG. 3 and the effective date constraints of Table 1 above. Consider a scenario in which User 2 attempts to explicitly activate the Accounts Receivables role while at least one of the Accounts Receivable Clerk, Billing Clerk, or Cashier roles is active. Under scenario (2), this activation will be allowed because at least one of the immediate senior roles of Accounts Receivable is currently active. Further, assume that User 2 attempts to explicitly activate the indirectly granted Accounts Receivable role on Sep. 9, 2007. In this case, the Accounts Receivable role will have three multiple net effective date constraints: (1) the net effective date constraint for the path involving immediate senior role Accounts Receivable Clerk is {ALL ∩ (Sep. 10, 2007-Sep. 15, 2007)} or (Sep. 10, 2007-Sep. 15, 2007); (2) the net effective date constraint for the path involving immediate senior role Billing Clerk is {ALL ∩ (Sep. 9, 2007-Sep. 12, 2007)} or (Sep. 9, 2007-Sep. 12, 2007); and (3) the net effective date constraint for the path involving immediate senior role Cashier is {ALL ∩ (Sep. 12, 2007-Sep. 20, 2007)} or (Sep. 12, 2007-Sep. 20, 2007). Thus, the date interval during which the indirectly granted Accounts Receivable role is effective is the union of {(Sep. 10, 2007-Sep. 15, 2007), (Sep. 9, 2007-Sep. 12, 2007), and (Sep. 12, 2007-Sep. 20, 2007)} or (Sep. 9, 2007-Sep. 20, 2007).

In one embodiment, an indirectly granted role is automatically activated and deactivated for a user's session at the appropriate times. An indirectly granted role is automatically activated at the time when both the role is effective and at least one immediate senior role is active. An indirectly granted role is automatically deactivated at the time when either the role becomes no longer effective or when all of the immediate senior roles become inactive.

Adhering to scenario (2), in which an indirectly granted role cannot be explicitly activated by a user, provides security, auditing, and accounting benefits. These benefits exist even outside the context of using effective date constraints. A role hierarchy is designed to allow upward inheritance of privileges from junior roles to senior roles. However, this upward inheritance is not equivalent to a direct grant of the junior roles. The role hierarchy implies that a user who is granted a senior role has the privileges of the junior roles, but only while the senior role is active. Allowing a user to exercise a privilege granted to a junior role while the senior role is not active, would allow the user to bypass implied security constraints of the role hierarchy.

For example, consider the case where a senior role directly granted to a user is not active because of a separation of duty constraint. In this case, allowing the user to exercise the privileges of the roles junior to the senior role would violate the separation of duty. If it is intended that the user be able to acquire the privileges of a currently indirectly granted junior role while the directly granted senior role is not active, then the user should be directly granted the junior role. By requiring a direct grant of the junior role, security, auditing and accounting of privileges are improved as a user can acquire a privilege of an indirectly granted junior role only when directly granted senior role is active.

Method for Effective Date Constraint Processing in a Role Hierarchy

The following description presents method steps that may be implemented using processor-executable instructions, for directing operation of a computing device under processor control. The processor-executable instructions may be stored on a computer-readable medium, such as hard disk, flash memory, physical memory, RAM, ROM, or the like. The processor-executable instructions may also be stored as a set of downloadable processor-executable instructions, for example, for downloading and installation from an Internet location (e.g., Web server).

Figure 4:
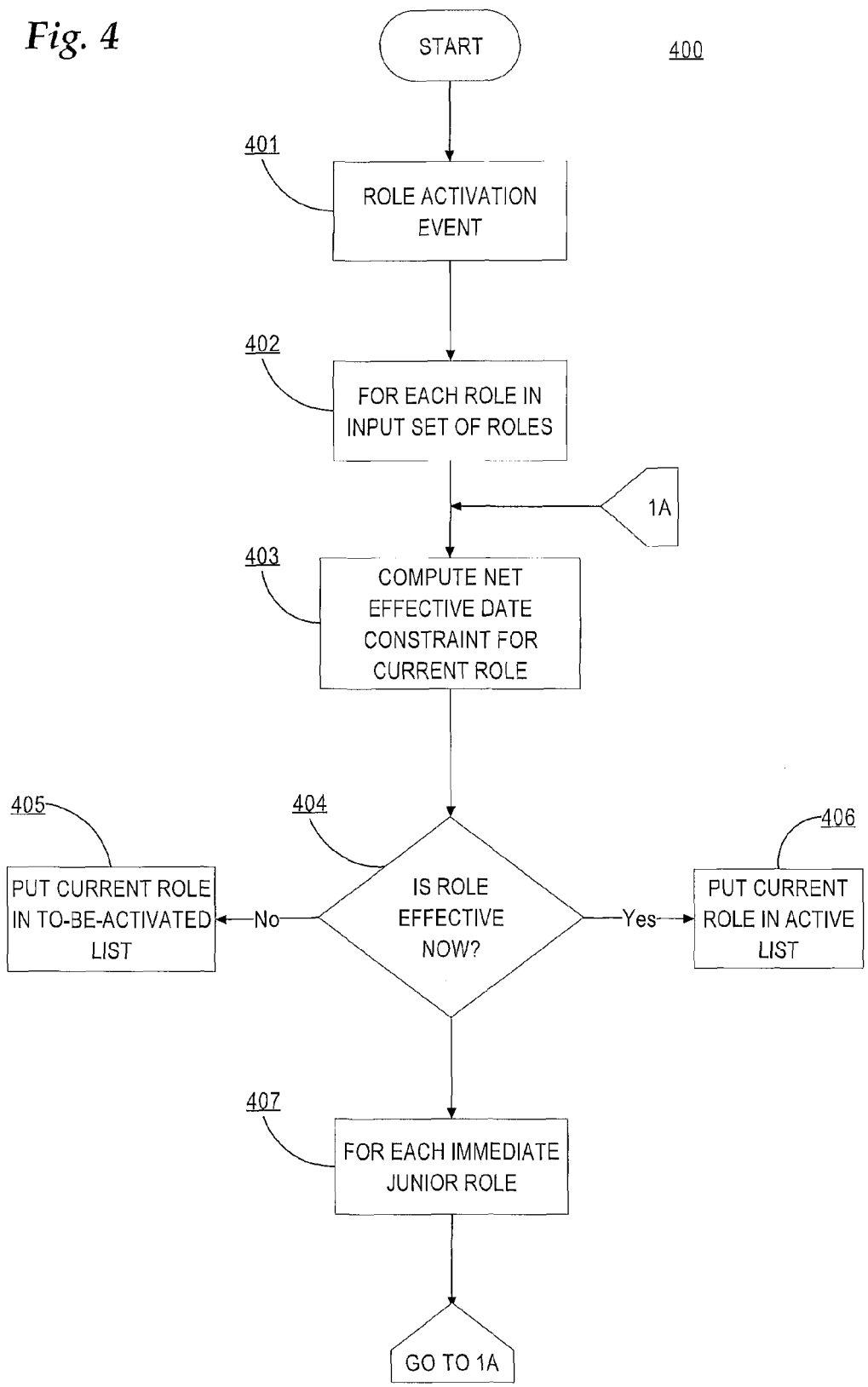
FIG. 4 comprises a flowchart illustrating the method steps of the operation of an embodiment of the present invention for effective date constraint processing in a role hierarchy.

FIG. 4 comprises a flowchart 400 illustrating the method steps of the operation of an embodiment of the present invention for effective date constraint processing in a role hierarchy. In its currently preferred embodiment, the method is performed by a multi-user computer system in the context of establishing, maintaining, and discarding a user's session.

At step 401, the system detects a role activation event. A role activation event occurs when either a user's session is being established or when an explicit request to activate one or more roles is made within the context of the user's session.

During establishment of a user's session, the system determines if there is an effective date constraint on the user's account. For example, the user's account record may have an associated start and end time during which the user's account is valid. If the user's account is not effective according to the associated effective date constraint, then the system terminates the user's connection and discards the session data for the user. Optionally, the system may send a message to the user informing the user that his or her account is currently not effective.

Assuming the user's account is currently effective or is not constrained by an effective date constraint, the system determines the set of roles for the user that are activated-by-default. In the currently preferred embodiment, only roles that are directly granted to the user can be activated-by-default and, by default, all roles that are directly granted to the user are activated-by-default. In an alternative embodiment, roles that are directly granted to a user are not activated-by-default and instead must be explicitly activated within the context of the user's session. In another alternative embodiment, each directly granted role is associated with data that indicates whether the role is activated-by-default or instead requires explicit activation.

In addition to the role activation event that occurs when a user's session is being established, a role activation event may also occur when a request is made to explicitly activate a role. In one embodiment, when a request is made to explicitly activate a role during a user's session, the system invokes the CheckActiveDeactiveQueues( ) routine. That routine checks the to-be-activated and the to-be-deactivated priorities queues maintained for the user's session. The CheckActiveDeactiveQueues( ) routine is described in greater detail below. In general, the CheckActiveDeactiveQueues( ) routine activates those currently de-active roles whose time has come to be activated and deactivates those currently active roles whose time has come to be deactivated. Note that some roles whose time has come to be activated may also be roles specified in the explicit activation request. For example, a date constrained junior role of an activated-by-default senior role may be added to the to-be-activated queue when the user's session is established and then actually activated when the CheckActiveDeactiveQueues( ) routine is invoked in response to an explicit request to activate the junior role made during the user's session.

Step 402 is the entry point of a loop comprising steps 402-407 that iterates over a set of input roles. In operation, the loop of steps 402-407 recursively traverses the role hierarchy in a depth-first or breadth-first manner along the various paths in the role hierarchy involving the set of input roles. Flowchart 400 depicts traversal of the role hierarchy in a depth-first manner (i.e., traverse from a role in the input item set to a junior role of that role before traversing from a role in the input item set to another role in the input item set). However, it should be understood that traversal of the role hierarchy may also be made in a breadth-first manner (i.e., traverse from a role in the input item set to another role in the input item set before traversing from a role in the input item set to a junior role).

The initial set of input roles depends on the type of role activation event detected in step 401. If the loop is invoked in the context of establishing a user's session, then the initial set of input roles is the set of activated-by-default roles as determined in step 401. If the loop is invoked in the context of a request to explicitly activate one or more roles, then the initial set of input roles is the set of roles specified in the explicit activation request.

In a currently preferred embodiment, for both role activation event types, the initial set of input roles comprise only roles that are directly granted to the user. This is because adhering to scenario (2) above prohibits explicit activation of indirectly granted roles in order to comply with the implied semantics of role hierarchies. Further, in a currently preferred embodiment, indirectly granted roles are not considered to be activated-by-default roles as their activation according to scenario (2) is dependent on their being at least one active immediate senior role.

The loop, in step 403, computes a net effective date constraint for each role visited during the traversal. For a given role in the role hierarchy, the net effective date constraint for the role can be computed as $\{EDI_{gr} \cap EDI_{rg} \cap EDI_{pg}\}$, where $EDI_{gr}$ is the effective date constraint interval on the given role, $EDI_{rg}$ is the effective date constraint interval on the role grant from the given role to the principal grantee, and $EDI_{pg}$ is effective date constraint interval on the principal grantee. When the given role is a directly granted role, then the principal grantee is the user to whom the given role is directly granted. When the given role is an indirectly granted role, then the principal grantee is an immediate senior role for which a net effective date constraint has already been computed during the recursive traversal of the role hierarchy. When the given role is a directly granted role, then $EDI_{pg}$ is the effective date constraint on the user. When the given role is an indirectly granted role, then $EDI_{pg}$ is the net effective date constraint computed for the immediate senior role of the given role.

During execution of the loop, the net effective date constraint computed for a role is compared against the current time in step 404 to determine whether the role is currently effective or will become effective at some point in the future. Depending on when the role is effective, the role is either added in step 405 to the to-be-activated priority queue of roles maintained for the user's session or added in step 406 to the currently active list of roles maintained for the user's session. Additionally, if the net effective date constraint of the role indicates that the role has an effective end date, then the role is also added to the to-be-deactivated priority queue of roles maintained for the user's session. As described previously, when a role is added to the to-be-activated priority queue of roles the role is added in ascending order of effective start date. When a role is added to the to-be-deactivated priority queue of roles the role is added in ascending order of effective end date.

At step 407, a determination is made whether there are any immediate junior roles of the current role. If there are no immediate junior roles of the current input role, then the method returns to step 402 to process the next role in the current set of input roles. If, however, there are immediate junior roles of current input role, then the method proceeds recursively to step 403 in which an immediate junior role of the current role becomes the new current role for that recursive invocation of steps 403-407.

After the method of FIG. 4 has completed, each net effective date constraint computed for each role added to the to-be-activated priority queue and the to-be-deactivated priority queue of roles has been computed in a manner such that the semantics of scenarios (1) and (2) above are preserved. In particular, each to-be-activated directly granted role will be active (assuming there is no explicit request to deactivate the role) during the role's computed net effective date constraint interval regardless if any of its immediate senior roles are active or effective during that time. And each to-be-activated indirectly granted role will be active during the role's computed net effective date constraint interval and only while there is at least one immediate senior role active.

Net Effective Date Constraints for Roles During an Example Role Activation Sequence The following will describe operations of an embodiment of the present invention for effective date constraint processing in a role hierarchy. For purposes of this discussion, the example role hierarchy of FIG. 3 and the example effective date constraints of Table 1 are used and following example sequence of actions is assumed:

(1) User 1 explicitly activates Accounts Receivable role at anytime; and (2) User 2 explicitly activates Cashier role on Sep. 12, 2007; and With regard to action (1), the net effective date constraint for the Accounts Receivable role as directly granted to User 1 will be computed according to the method of FIG. 4 as {ALL ∩ ALL ∩ ALL} or ALL. This is because, according to Table 1 above, none of User 1, the role grant of the Accounts Receivable role to User 1, or the Accounts Receivable role is date constrained. Therefore, User 1 can explicitly activate the directly granted Accounts Receivable role at anytime.

With regard to action (2), the net effective date constraint for the Cashier role as directly granted to User 1 will be computed according to the method of FIG. 4 as {ALL ∩ ALL ∩ (Sep. 12, 2007-Sep. 20, 2007)} or (Sep. 12, 2007-Sep. 20, 2007). The net effective date constraint for the indirectly granted Accounts Receivable role will be computed according to the method of FIG. 4 as {ALL ∩ ALL ∩ (Sep. 12, 2007-Sep. 20, 2007)} or (Sep. 12, 2007-Sep. 20, 2007). As result of executing the method of FIG. 4 in response to the request to explicitly activate the Cashier role, the Cashier Role and the Accounts Receivable role will be added to User 2's to-be-deactivated priority queue of roles such that both roles are deactivated on or after Sep. 20, 2007.

Net Effective Date Constraints for Roles in Example Role Hierarchies Containing Effective Date Constraints on Roles, Role Grants, and Users The operation of the method of FIG. 4 will now be described in the context of example role hierarchies in which effective date constraints are applied to roles, role grants, and users. In this context, a role grant refers to both a direct grant of a role to a user and a direct grant of a role to another role. For example, in the role hierarchy depicted in FIG. 3, the Accounts Receivable role is directly granted to User 1 and directly granted to the Cashier role.

Consider a simple example of effective date constraints on the roles, role grants, and users depicted in FIG. 3 as follows:

TABLE 2

Effective Date Constraints on Roles, Role Grants, and Users

|  | Start Date: | End Date: |
|---|---|---|
| Role: |  |  |
| Cashier | Sep. 1, 2007 | Sep. 30, 2007 |
| Accounts Receivable | ALL | ALL |
| Role Grants: |  |  |
| Cashier Role to User 1 | Sep. 12, 2007 | Sep. 20, 2007 |
| Accounts Receivable Role to Cashier Role | Sep. 12, 2007 | Sep. 15, 2007 |
| Users: |  |  |
| User 2 | Jan. 1, 2007 | Dec. 31, 2007 |

As shown in Table 2, this example involves five different effective date constraints: (1) the effective date constraint on User 2, (2) the effective date constraint on the Accounts Receivable role, (3) the effective date constraint on the Cashier Role, (4) the effective date constraint on the role grant of the Cashier role to User 2, and (5) the effective date constraint on the role grant of the Accounts Receivable role to the Cashier role.

With regard to User 1, the net effective date constraint for the Accounts Receivable role as directly granted to User 1 will be computed according to the method of FIG. 4 as the intersection of the effective date constraint for User 1 (ALL), the effective date constraint for the role grant of the Accounts Receivable role to User 1 (ALL), and the effective date constraint on the Accounts Receivable role (ALL). That intersection is ALL. Therefore, the net effective date constraint for the Accounts Receivable role as directly granted to User 1 is ALL.

With regard to User 2, the net effective date constraint for the Cashier Role as directly granted to User 2 will be computed according to the method of FIG. 4 as the intersection of the effective date constraint for User 2 (Jan. 1, 2007-Dec. 31, 2007), the effective date constraint on the role grant of the Cashier role to User 2 (Sep. 12, 2007-Sep. 20, 2007), and the effective date constraint on the Cashier role itself (Sep. 1, 2007-Sep. 30, 2007). That intersection is (Sep. 12, 2007-Sep. 20, 2007). Therefore, the net effective date constraint for the Cashier role as directly granted to User 2 is (Sep. 12, 2007-Sep. 20, 2007).

Further with regard to User 2, the net effective date constraint for the Accounts Receivable role as indirectly granted to User 2 will be computed according to the method of FIG. 4 as the intersection of the net effective date constraint for Cashier role as directly granted to User 2 (Sep. 12, 2007-Sep. 20, 2007), the effective date constraint on the role grant of the Accounts Receivable role to the Cashier role (Sep. 12, 2007-Sep. 15, 2007), and the effective date constraint on the Accounts Receivable role (ALL). That intersection is (Sep. 12, 2007-Sep. 15, 2007). Thus, the net effective date constraint for the Accounts Receivable role as indirectly granted to User 2 is (Sep. 12, 2007-Sep. 15, 2007).

Figure 5:
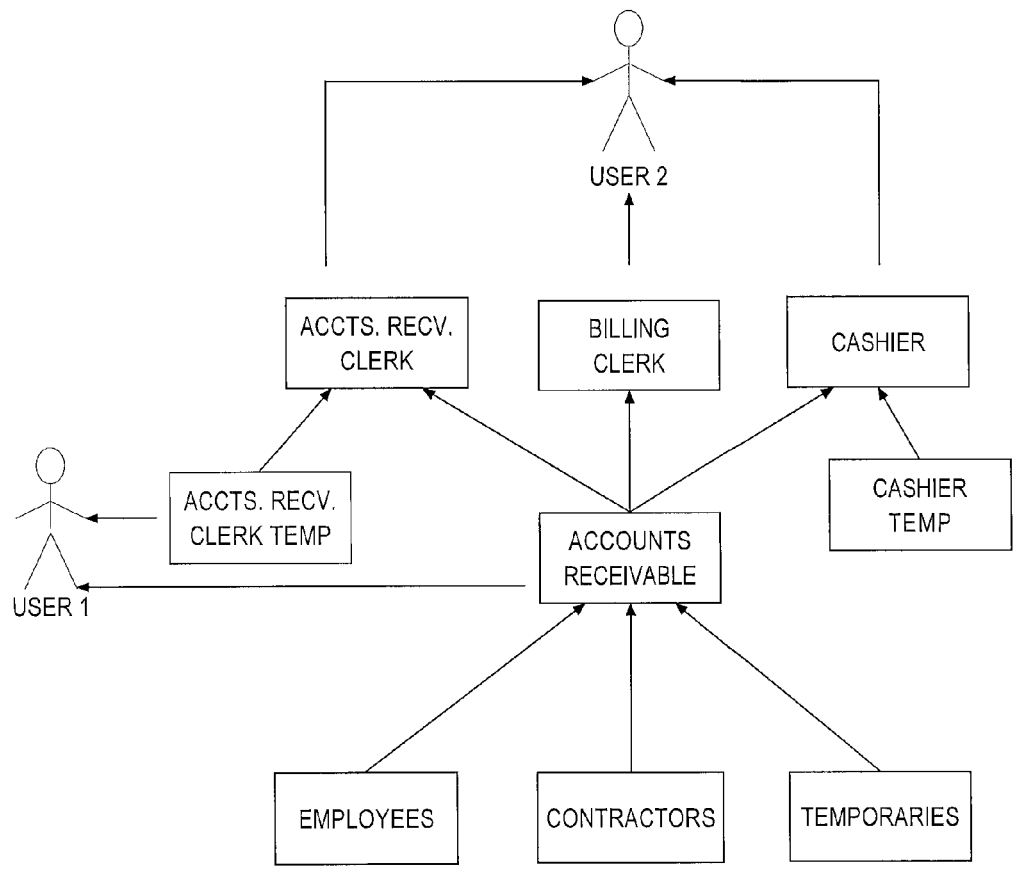
FIG. 5 is a block-diagram illustrating an example role hierarchy.

As a more complicated example of computing net effective date constraints for roles in a role hierarchy, consider the role hierarchy of FIG. 5. In FIG. 5, User 1 is directly granted the Accounts Receivable Clerk Temp role and the Accounts Receivable role. User 2 is directly granted the Accounts Receivable Clerk role, the Billing Clerk role, and the Cashier role. By virtue of direct role grants, User 1 is indirectly granted the Employees role, the Contractors role, and the Temporaries role. Also by virtue of direct role grants, User 2 is indirectly granted the roles Accounts Receivable, Employees, Contractors, and Temporaries.

Table 3 below provides example effective date constraints on various roles, role grants, and users of the role hierarchy depicted in FIG. 5. Elements of the role hierarchy that are not expressly designated with an effective date constraint are assumed to be effective at all times (i.e., ALL).

TABLE 3

Effective Date Constraints on Roles, Role Grants, and Users

|  | Start Date: | End Date: |
|---|---|---|
| Role: |  |  |
| Cashier | Sep. 1, 2007 | Sep. 30, 2007 |
| Accounts Receivable | Aug. 1, 2007 | Sep. 30, 2007 |
| Contractors | Aug. 1, 2007 | Aug. 10, 2007 |
| Temporaries | Aug. 10, 2007 | Aug. 20, 2007 |
| Role Grants: |  |  |
| Cashier Role to User 2 | Sep. 12, 2007 | Sep. 20, 2007 |
| Accounts Receivable Role to Cashier Role | Sep. 15, 2007 | Sep. 20, 2007 |
| Accounts Receivable Role to Billing Clerk Role | Aug. 15, 2007 | Sep. 15, 2007 |
| Accounts Receivable Role to Accounts Receivable Clerk Role | Aug. 1, 2007 | Aug. 15, 2007 |
| Users: |  |  |
| User 2 | Jan. 1, 2007 | Dec. 31, 2007 |

Tables 4 and 5 below show net effective date constraint calculations for each role of the role hierarchy depicted in FIG. 5 using the effective date constraints of Table 3. The net effective date constraints may be computed using the method of FIG. 4 described previously. The "NEDC" columns of Tables 4 and 5 each show the computed net effective date constraint for each role that is either directly or indirectly granted to the corresponding user. Roles that are neither directly nor indirectly granted to the corresponding user are designated with a N/A.

In some cases, there is more than one net effective date constraint for a role granted to a user. For example, there are three net effective date constraints for the Accounts Receivable role as indirectly granted to User 2. The three net effective date constraints reflect the three separate roles granted to User 2 to which the Accounts Receivable is directly granted. In particular, the Accounts Receivable role is directly granted to the Accounts Receivable Clerk role, the Billing Clerk role, and the Cashier role each of which are directly granted to User 2. Since according to scenario (2) described previously, an indirectly granted role (e.g., the Accounts Receivable role) may be active when it is effective and at least one immediate senior role is active, the Accounts Receivable as indirectly granted to User 2 has three possible net effective date constraint intervals in which it may be active during User 2's session. To ensure that a role with multiple net effective date constraints is activated and deactivated at the appropriate times, the method of FIG. 4 may add separate entries to the to-be-activated and the to-be-deactivated priority queues maintained for a user's session for each of a multiple net effective date constraints computed for a role.

The "Computation" column of Tables 4 and 5 each show how the corresponding net effective date constraints listed in the corresponding "NEDC" column are calculated using the method of FIG. 4.

TABLE 4

Net Effective Date Constraints (NEDC) for User 1

| Roles: | NEDC: | Computation: |
|---|---|---|
| Accts. Recv. Clerk | N/A | |
| Billing Clerk | N/A | |
| Cashier | N/A | |
| Accounts Receivable | (Aug. 1, 2007-Sep. 30, 2007) | (Aug. 1, 2007-Sep. 30, 2007) ∩ ALL ∩ ALL |
| Employees | (Aug. 1, 2007-Sep. 30, 2007) | (Aug. 1, 2007-Sep. 30, 2007) ∩ ALL ∩ ALL |
| Contractors | (Aug. 1, 2007-Aug. 10, 2007) | (Aug. 1, 2007-Sep. 30, 2007) ∩ ALL ∩ (Aug. 1, 2007-Aug. 10, 2007) |
| Temporaries | (Aug. 10, 2007-Aug. 20, 2007) | (Aug. 1, 2007-Sep. 30, 2007) ∩ ALL ∩ (Aug. 10, 2007-Aug. 20, 2007) |
| Accts. Recv. Clerk Temp | ALL | ALL ∩ ALL ∩ ALL |
| Cashier Temp | N/A | |

Figure 6:
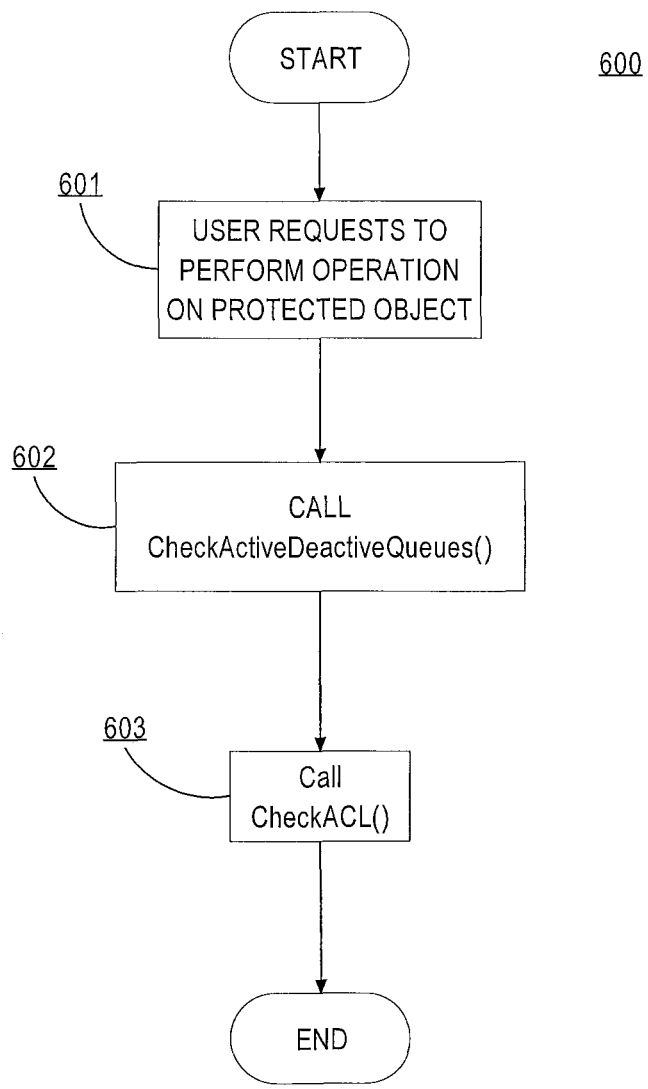
FIG. 6 illustrates a high-level flowchart for dynamic enforcement of effective date constraints on roles, role grants, and users in a role hierarchy.

Method for Dynamic Enforcement of Effective Date Constraints on Roles, Role Grants, and Users in a Role Hierarchy FIG. 6 illustrates a high-level flowchart 600 for dynamic enforcement of effective date constraints on roles, role grants, and users in a role hierarchy. In contrast to existing systems which typically only perform a one-time-check at the establishment of a user's session, the method of FIG. 6 may be used within a computer system to activate and deactivate roles granted to a user during the user's session as and when the appropriate time arrives. Also in contrast to existing systems which do not account for date constraints on roles or role grants when enforcing role-based access controls, the method of FIG. 6 may be used by a multi-user system to dynamically activate and deactivate date constrained roles in a role hierarchy.

The method steps of the method of FIG. 6 may be implemented using processor-executable instructions, for directing operation of a computing device under processor control. The processor-executable instructions may be stored on a computer-readable medium, such as hard disk, flash memory, physical memory, RAM, ROM, or the like. The processor-executable instructions may also be stored as a set of downloadable processor-executable instructions, for example, for downloading and installation from an Internet location (e.g., Web server). In its currently preferred embodiment, the method of FIG. 6 is performed by a computer system in the context of a user's session.

At step 601, the user makes a request to perform an operation on a protected object. A protected object is any object that requires a privilege to perform an operation on the object. The term object refers broadly to any entity that contains or receives information. For example, objects in a relational database system include columns, rows, tables, and views. As another example, objects in an operating system include files and directories.

A protected object may be associated with an access control list. The access control list specifies the privileges required to perform various operations. For example, in a

TABLE 5

Net Effective Date Constraints (NEDC) for User 2

| Roles: | NEDC: | Computation: |
|---|---|---|
| Accts. Recv. Clerk | (Jan. 1, 2007-Dec. 31, 2007) | (Jan. 1, 2007-Dec. 31, 2007) ∩ ALL ∩ ALL |
| Billing Clerk | (Jan. 1, 2007-Dec. 31, 2007) | (Jan. 1, 2007-Dec. 31, 2007) ∩ ALL ∩ ALL |
| Cashier | (Sep. 12, 2007-Sep. 20, 2007) | (Sep. 1, 2007-Sep. 30, 2007) ∩ (Sep. 12, 2007-Sep. 20, 2007) ∩ (Jan. 1, 2007-Dec. 31, 2007) |
| Accounts Receivable | (Sep. 15, 2007-Sep. 20, 2007) (Aug. 15, 2007-Sep. 15, 2007) (Aug. 1, 2007-Aug. 15, 2007) | (Sep. 12, 2007-Sep. 20, 2007) ∩ (Sep. 15, 2007-Sep. 20, 2007) ∩ (Aug. 1, 2007-Sep. 30, 2007) <br> (Jan. 1, 2007-Dec. 31, 2007) ∩ (Aug. 15, 2007-Sep. 15, 2007) ∩ (Aug. 1, 2007-Sep. 30, 2007) <br> (Jan. 1, 2007-Dec. 31, 2007) ∩ (Aug. 1, 2007-Aug. 15, 2007) ∩ (Aug. 1, 2007-Sep. 30, 2007) |
| Employees | (Sep. 15, 2007-Sep. 20, 2007) (Aug. 15, 2007-Sep. 15, 2007) (Aug. 1, 2007-Aug. 15, 2007) | (Sep. 15, 2007-Sep. 20, 2007) ∩ ALL ∩ ALL <br> (Aug. 15, 2007-Sep. 15, 2007) ∩ ALL ∩ ALL <br> (Aug. 1, 2007-Aug. 15, 2007) ∩ ALL ∩ ALL |
| Contractors | (Aug. 1, 2007-Aug. 10, 2007) | (Sep. 15, 2007-Sep. 20, 2007) ∩ ALL ∩ (Aug. 1, 2007-Aug. 10, 2007) <br> (Aug. 15, 2007-Sep. 15, 2007) ∩ ALL ∩ (Aug. 1, 2007-Aug. 10, 2007) <br> (Aug. 1, 2007-Sep. 15, 2007) ∩ ALL ∩ (Aug. 1, 2007-Aug. 10, 2007) |
| Temporaries | (Aug. 15, 2007-Aug. 20, 2007) (Aug. 10, 2007-Aug. 15, 2007) | (Sep. 15, 2007-Sep. 20, 2007) ∩ ALL ∩ (Aug. 10, 2007-Aug. 20, 2007) <br> (Aug. 15, 2007-Sep. 15, 2007) ∩ ALL ∩ (Aug. 10, 2007-Aug. 20, 2007) <br> (Aug. 1, 2007-Aug. 15, 2007) ∩ ALL ∩ (Aug. 10, 2007-Aug. 20, 2007) |
| Accts. Recv. Clerk Temp | (Jan. 1, 2007-Dec. 31, 2007) | (Jan. 1, 2007-Dec. 31, 2007) ∩ ALL ∩ ALL |
| Cashier Temp | (Sep. 12, 2007-Sep. 20, 2007) | (Sep. 12, 2007-Sep. 20, 2007) ∩ ALL ∩ ALL | relational database, an access control list associated with a table may specify that Privilege A is required to read data from the table and Privilege B is required to write data to the table. In context of role-based access control, a user granted a role that has been granted privilege A can read data from the table while the role is active and a user granted a role that has been granted privilege B can write data to the table while that role is active. Note that in this example Privilege A and Privilege B do not refer to any privilege or any type of privilege in particular and are used to denote arbitrary privileges for the purposes of illustration.

The user's request to perform an operation on a protected object can be in any form understandable by the system responsible for enforcing access to the protected object. For example, in a relational database management, the user's request may be in the form of a Structured Query Language (SQL) query (e.g., Select, Update, Delete, or Insert operation). As another example, in an operating system, the user's request may be in the form of a file system operation such as a request to open a file or create a new file in a directory.

At step 602, in response to detecting a user's request to perform an operation on a protected object, the CheckActiveDeactiveQueues( ) routine is invoked. Note that the particular name of the routine is not a requirement of the present invention and that any suitable name may be used for the routine. Further, the logic embodied in the CheckActiveDeactiveQueues( ) routine may be implemented by more than one routine or function which in turn may invoke one or more sub-routines or sub-functions.

A function of the CheckActiveDeactiveQueues( ) routine is to activate those currently inactive roles granted to a user whose time has come to be activated and deactivate those currently active roles granted to the user whose time has come to be deactivated. In the context of a user's session, a role may be activated by adding the role the user's active list of roles maintained for the user's session and role may be deactivated by removing the role from the user's active list of roles.

Figure 7A:
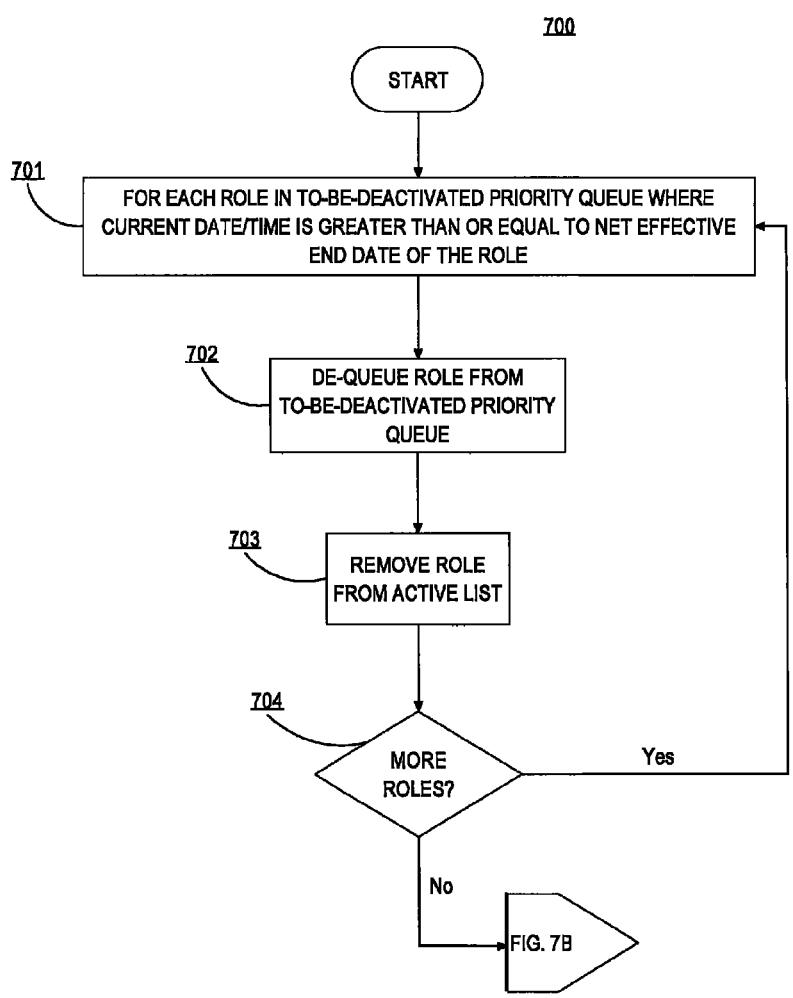
FIGS. 7A-7B comprise a single flowchart illustrating the method steps of operation of the CheckActiveDeactiveQueues( ) routine according to an embodiment of the present invention.
Figure 7B:
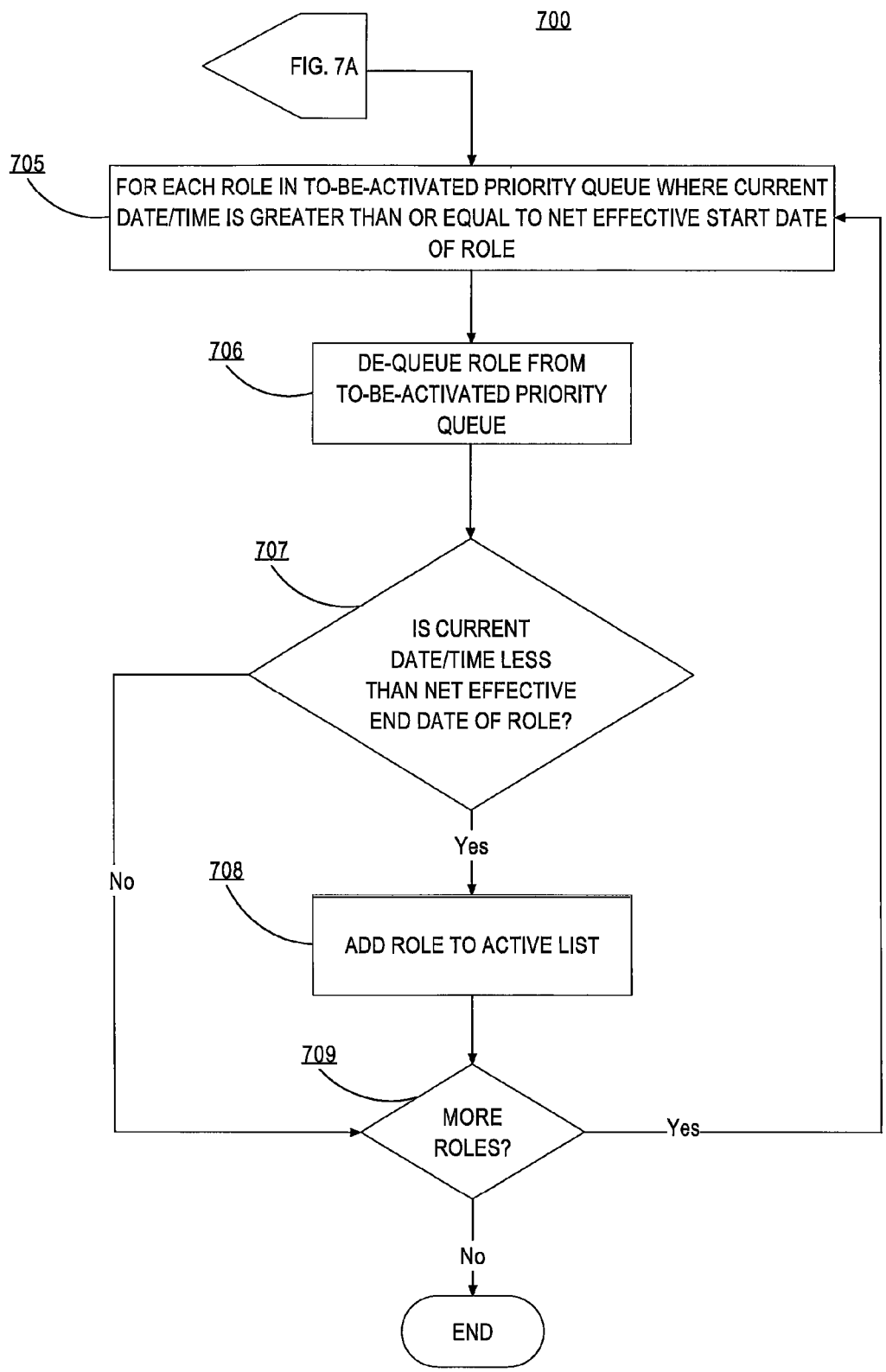

FIGS. 7A-7B comprise a single flowchart 700 illustrating the method steps of operation of the CheckActiveDeactiveQueues( ) routine according to an embodiment of the present invention. Flowchart 700 corresponds to the method step 602 of the method of FIG. 6 for dynamic enforcement of effective date constraints on roles, role grants, and users in a role hierarchy.

At step 701, the head of the to-be-deactivated priority queue of roles maintained for the user's session is inspected. The to-be-deactivated priority queue maintains roles granted to the user that are not to be active after some time in the future. The roles in the queue are ordered in ascending order of their net effective end dates. The queue is initially populated with roles when the user's database session is established. Thereafter, during the user's database session, the queue is re-populated whenever an explicit request is made to activate a role or deactivate a role. A method for adding roles to the to-be-deactivated priority queue for a user's session is described previously with respect to FIG. 4.

For each invocation of the CheckActiveDeactive Queues( ) routine, step 701 is performed once for each role in the to-be-deactivated priority queue in which the net effective end date computed for the role is less than or equal to the current date/time. Since roles in the to-be-deactivated priority queue are ordered in ascending order of net effective end date, determining the set of to-be-deactivated roles whose time has come to be de-active is a matter of dequeuing the head of the priority queue until the head of the queue is a role that has a net effective end date that is greater than the current date/time.

At step 702, the head of the priority queue is dequeued for a role that has a net effective end date that is less than or equal to the current date/time. The new head of the queue becomes the next to-be-deactivated role in the queue in ascending order of net effective end dates.

At step 703, the role is removed from the list of active roles maintained for the user's database session thereby effectively deactivating the role for the session.

At step 704, the loop of steps 701, 702, and 703 is repeated for each role remaining in the to-be-deactivated priority queue where the current date/time is greater than or equal to the net effective end date of the role.

A similar loop is repeated for the to-be-activated priority queue. At step 705, the head of the to-be-activated priority queue of roles maintained for the user's session is inspected. The to-be-activated priority queue maintains roles granted to the user that are to be active during some time period in the future. The roles are ordered in the queue in ascending order of their net effective start dates. The queue is initially populated with roles when the user's database session is established. Thereafter, during the user's database session, the queue is re-populated whenever an explicit request is made to activate a role or deactivate a role. A method for adding roles to the to-be-activated priority queue for a user's session is described previously with respect to FIG. 4.

For each invocation of the CheckActiveDeactive Queues( ) routine, step 705 is performed once for each role in the to-be-activated priority queue in which the net effective start date computed for the role is less than or equal to the current date/time. Note that the set of roles in the to-be-activated priority queue for which the net effective start date is less then or equal to the current date/time may include roles that have a net effective end date that is also less than or equal to the current date/time. Those expired roles should be removed from the priority queue but should not be activated. Accordingly, a check is made in step 707 to determine whether a to-be-activated role whose effective start time has arrived is still active based on the role's effective end date. Since roles in the to-be-activated priority queue are ordered in ascending order of net effective start date, determining the set of to-be-activated roles for which the net effective start date is less then or equal to the current date/time is a matter of dequeuing the head of the to-be-activated priority queue until the head of the queue is a role that has a net effective start date that is greater than the current date/time.

At step 706, the head of the to-be-activated priority queue is dequeued for a role that has a net effective start date that is less than or equal to the current date/time. The new head of the queue becomes the next to-be-activated role in the queue in ascending order of net effective start dates.

At step 707, a check is made to determine whether the role dequeued in step 706 has a net effective end date that is greater than the current date/time. If so, the role is activated for the user's session by being placed in the active roles list for the session. Otherwise, the method of FIGS. 7A-7B proceeds to step 709.

At step 709, the loop of steps 705-708 is repeated for each role remaining in the to-be-activated priority queue where the current date/time is greater than or equal to the net effective start date of the role.

Returning to FIG. 6, at step 603, a call to the Check ACL( ) routine is made to determine whether the user has the necessary privileges to perform the operation on the protected object requested in step 601. Note that the particular name of CheckACL( ) routine is not a requirement of the present invention and that any suitable name may be used for the routine. Further, the logic embodied in the CheckACL( ) routine may be implemented by more than one routine or function which in turn may invoke one or more sub-routines or sub-functions.

A function of the CheckACL( ) routine is to determine whether the user has acquired the necessary privileges to perform the requested operation on the protected object based on the active roles list maintained for the user's session and the access control list associated with the protected object. The CheckACL( ) routine obtains from the access control list the privileges that are required to perform the requested operation and consults the active roles list maintained for the user's database session to determine if the user currently has acquired those necessary privileges.

In one embodiment, the active roles list for the user's database session is a hash data structure in which the keys comprise the current set of privileges acquired by the user from the set of currently active roles granted to the user. The CheckACL( ) function can efficiently determine whether the user has a necessary privilege by using the privilege as a key into the active roles hash data structure that is maintained for the user's session.

By calling the CheckActiveDeactiveQueues( ) routine before the CheckACL( ) routine is called each time a user requests to perform an operation on a protected object, the active roles list maintained for the user's database session will be current according to the effective date constraints placed on roles, role grants, and users in the role hierarchy. Further, the user is not required to re-authenticate or re-establish a database session before performing the operation in order to obtain the most up-to-date set of active roles granted to the user.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computer systems, desktop computer systems, portable computer systems, handheld devices, networking devices or any other device that incorporates hard-wired and/or program logic to implement the techniques.

Figure 8:
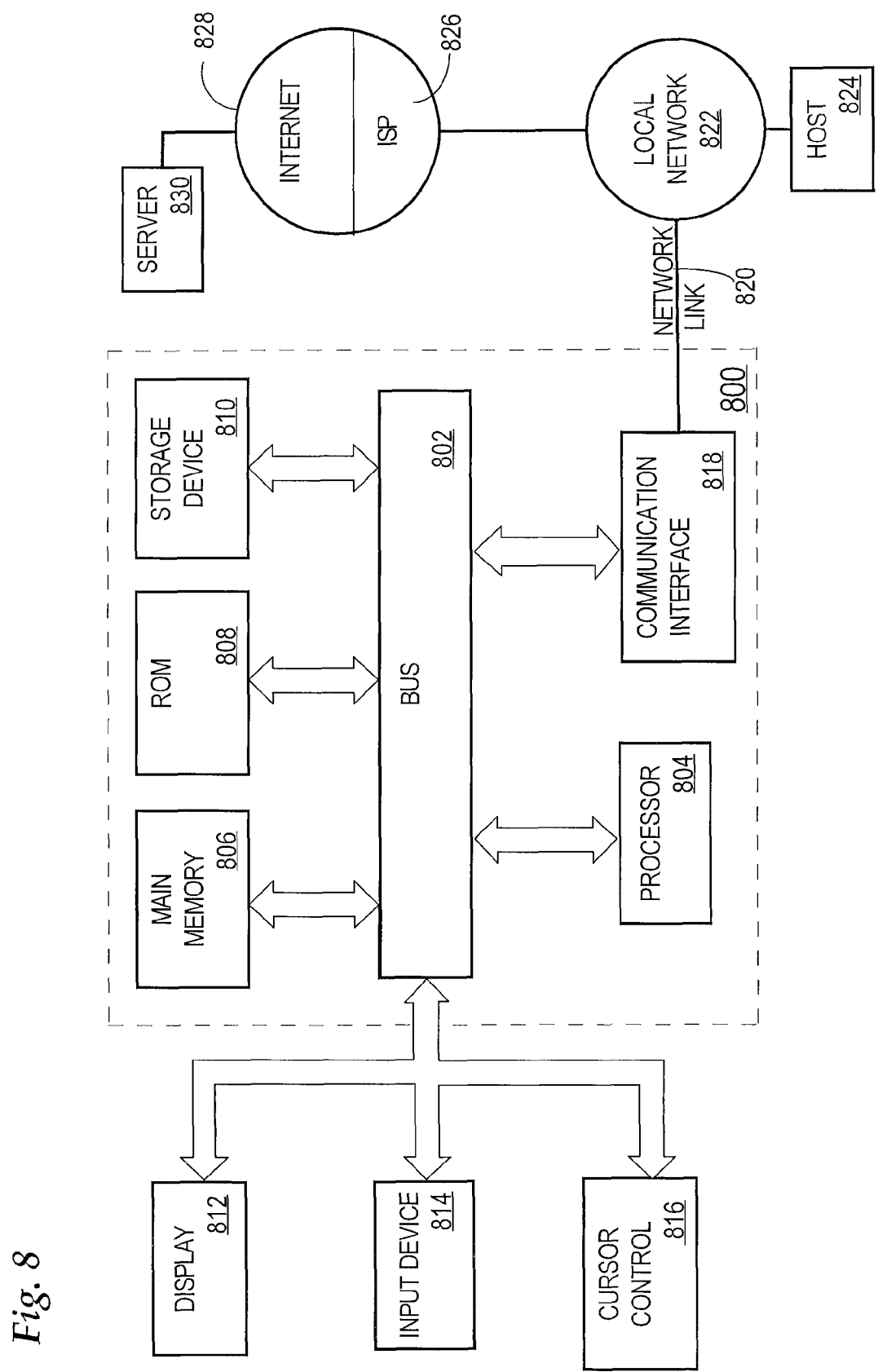
FIG. 8 is a block diagram that illustrates the general structure of a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for implementing effective date constraints, the method comprising:
    storing data that represents a first effective date constraint on a role, the first effective date constraint having a start date and an end date;
    storing data that represents a second effective date constraint on a grant of the role to a grantee, the second effective date constraint having a start date and an end date;
    storing data that represents a third effective date constraint on the grantee, the third effective date constraint having a start date and an end date;
    computing a net effective date constraint for the role relative to the grantee by computing the intersection of the first effective date constraint, the second effective date constraint, and the third effective date constraint;
    wherein the net effective date constraint has a net effective start date and a net effective end date;
    prior to the net effective start date, establishing a session for a user;
    during the session and after the net effective start date:
        receiving a request to perform an operation on a protected object on behalf of the user,
        in response to receiving the request, determining whether the role is currently effective for the session based at least in part on a comparison of a current date to the net effective start date,
        in response to determining that the role is currently effective for the session, activating the role for the session such that the user acquires a privilege associated with the role without having to establish a new session for the user,
        wherein, prior to receiving the request, the role is not active for the session, and
        after activating the role for the session, allowing the requested operation on the protected object to be performed;
    wherein the method is performed by one or more computing devices.

2. The method of claim 1, wherein the role is of a role hierarchy and the grantee is another role of the role hierarchy.

3. The method of claim 2, wherein the role is directly granted to the user.

4. The method of claim 2, wherein the another role is indirectly granted to the user.

5. The method of claim 2, wherein the another role is an immediate junior role of the role in the role hierarchy.

6. The method of claim 1, wherein the grantee is the user.

7. The method of claim 6, wherein the role is directly granted to the user.

8. The method of claim 1, wherein activating the role includes adding data representing the role to a data structure maintained for the user's session.

9. The method of claim 8, wherein the data structure maintained for the user's session represents a set of roles granted to the user that are currently active.

10. The method of claim 1, wherein determining whether the role is currently effective for the session includes determining that the current date is equal to or greater than the net effective start date.

11. The method of claim 10, wherein determining whether the role is currently effective includes dequeuing data from the head of a priority queue maintained for the user's session.

12. The method of claim 11, wherein the priority queue represents a set of roles granted to the user that are to be activated.

13. The method of claim 1, wherein the net effective start date, the net effective end date, and the current date each indicate a date and a time.

14. A method for implementing effective date constraints, the method comprising:
   storing, in a first data structure, role data which represents a plurality of roles assigned to a plurality of users;
   storing, in a second data structure, access control data which specifies one or more privileges required to perform one or more operations on a plurality of data objects and one or more roles which are granted the one or more privileges;
   storing data that represents an effective date constraint on a role of the plurality of roles, the effective date constraint having a start date and an end date;
   wherein for each role of said plurality of roles:
   respective privileges to perform operations are assigned to said each role;
   wherein the respective privileges of said each role are acquired by a user based at least on assignment of said each role to said user;
   prior to the end date, establishing a session for a particular user;
   storing, in a third data structure, role data which represents one or more active roles for the particular user;
   during the session and after the start date:
      receiving a request to perform an operation on a protected object on behalf of the particular user, wherein, prior to receiving the request, a particular role of said plurality of roles is active for the session,
         wherein the particular role is assigned privileges to perform one or more operations on a plurality of data objects;
         wherein the particular role is assigned to a plurality of users;
      determining whether the particular role is currently effective for the session based at least in part on a comparison of a current date to the end date of the effective date constraint on the particular role;
      in response to determining that the particular role is currently not effective for the session, deactivating the particular role for the session without having to establish a new session for the particular user;
      wherein deactivating the particular role for the session comprises modifying particular role data representing the particular role in the third data structure to reflect that the particular role is currently not effective for the particular user;
   wherein the method is performed by one or more computing devices.

15. The method of claim 14, wherein the role data is ordered according to role end dates for each of the plurality of roles and role end dates are determined based, at least in part, on a date constraint applicable to the respective role.

16. The method of claim 14, wherein the start date, the end date, and the current date each indicate a date and a time.

17. The method of claim 14, wherein establishing the session for the user includes:
   obtaining, from a database, data that represents the role, the start date, and the end date; and
   storing the data in a computer memory.

18. A method for implementing effective date constraints in a role hierarchy, the method comprising:
   storing, in a first data structure, role data which represents a plurality of roles assigned to a plurality of users;
   storing, in a second data structure, access control data which specifies one or more privileges required to perform one or more operations on a plurality of data objects and one or more roles which are granted the one or more privileges;
   storing data that represents an effective date constraint on a grant of a senior role of a plurality of roles in a role hierarchy to a grantee, the effective date constraint having a start date and an end date;
   wherein for each role of said plurality of roles:
   respective privileges to perform operations are assigned to said each role;
   wherein the respective privileges of said each role are acquired by a user based at least on assignment of said each role to said user;
   prior to the start date, establishing a session for a particular user;
   storing, in a third data structure, role data which represents one or more active roles for the particular user;
   during the session and after the start date:
      receiving a request to perform an operation on a protected object on behalf of the particular user, wherein, prior to receiving the request, a junior role is not active for the session;
         wherein the one or more active roles are assigned privileges to perform one or more operations on a a plurality of data objects;
         wherein the senior role is assigned to a plurality of users;
      determining whether the junior role that is a junior role of the senior role is currently effective for the session based at least in part on a comparison of a current date to the start date of the effective date constraint on a grant of the senior role to the grantee, wherein the senior role inherits at least one privilege granted to the junior role, said junior role belonging to said plurality of roles;
      in response to determining that the junior role is currently effective for the session, activating the junior role for the session such that the user acquires a privilege associated with the junior role without having to establish a new session for the user;
   wherein the method is performed by one or more computing devices.

19. The method of claim 18, wherein the grantee is another role.

20. The method of claim 18, wherein the grantee is a user.

21. The method of claim 18, wherein the start date, the end date, and the current date each indicate a date and a time.

22. A non-transitory computer-readable storage medium storing instructions, which when executed by one or more processors of one or more computing devices, cause:
   storing data that represents a first effective date constraint on a role, the first effective date constraint having a start date and an end date;
   storing data that represents a second effective date constraint on a grant of the role to a grantee, the second effective date constraint having a start date and an end date;
   storing data that represents a third effective date constraint on the grantee, the third effective date constraint having a start date and an end date;
   computing a net effective date constraint for the role relative to the grantee by computing the intersection of the first effective date constraint, the second effective date constraint, and the third effective date constraint;
wherein the net effective date constraint has a net effective start date and a net effective end date;
prior to the net effective start date, establishing a session for a user;
during the session and after the net effective start date:
receiving a request to perform an operation on a protected object on behalf of the user,
in response to receiving the request, determining whether the role is currently effective for the session based at least in part on a comparison of a current date to the net effective start date,
in response to determining that the role is currently effective for the session, activating the role for the session such that the user acquires a privilege associated with the role without having to establish a new session for the user,
wherein, prior to receiving the request, the role is not active for the session, and
after activating the role for the session, allowing the requested operation on the protected object to be performed.

23. The non-transitory computer-readable storage medium of claim 22, wherein the role is of a role hierarchy and the grantee is another role of the role hierarchy.

24. The non-transitory computer-readable storage medium of claim 23, wherein the role is directly granted to the user.

25. The non-transitory computer-readable storage medium of claim 23, wherein the another role is indirectly granted to the user.

26. The non-transitory computer-readable storage medium of claim 23, wherein the another role is an immediate junior role of the role in the role hierarchy.

27. The non-transitory computer-readable storage medium of claim 22, wherein the grantee is the user.

28. The non-transitory computer-readable storage medium of claim 27, wherein the role is directly granted to the user.

29. The non-transitory computer-readable storage medium of claim 22, wherein activating the role includes adding data representing the role to a data structure maintained for the user's session.

30. The non-transitory computer-readable storage medium of claim 29, wherein the data structure maintained for the user's session represents a set of roles granted to the user that are currently active.

31. The non-transitory computer-readable storage medium of claim 22, wherein determining whether the role is currently effective for the session includes determining that the current date is equal to or greater than the net effective start date.

32. The non-transitory computer-readable storage medium of claim 31, wherein determining whether the role is currently effective includes dequeuing data from the head of a priority queue maintained for the user's session.

33. The non-transitory computer-readable storage medium of claim 32, determining whether the role is currently effective includes dequeuing data from the head of a priority queue maintained for the user's session.

34. The non-transitory computer-readable storage medium of claim 22, wherein the net effective start date, the net effective end date, and the current date each indicate a date and a time.

35. A non-transitory computer-readable storage medium storing instructions, which when executed by one or more processors of one or more computing devices, cause:
storing, in a first data structure, role data which represents a plurality of roles assigned to a plurality of users;
storing, in a second data structure, access control data which specifies one or more privileges required to perform one or more operations on a plurality of data objects and one or more roles which are granted the one or more privileges;
storing data that represents an effective date constraint on a role of a plurality of roles, the effective date constraint having a start date and an end date;
wherein for each role of said plurality of roles:
respective privileges to perform operations are assigned to said each role;
wherein the respective privileges of said each role are acquired by a user based at least on assignment of said each role to said user;
prior to the end date, establishing a session for a particular user;
storing, in a third data structure, role data which represents one or more active roles for the particular user;
during the session and after the start date:
receiving a request to perform an operation on a protected object on behalf of the particular user, wherein, prior to receiving the request, a particular role of said plurality of roles is active for the session,
wherein the particular role is assigned privileges to perform one or more operations on a plurality of data objects;
wherein the particular role is assigned to a plurality of users;
determining whether the particular role is currently effective for the session based at least in part on a comparison of a current date to the end date of the effective date constraint on the particular role;
in response to determining that the particular role is currently not effective for the session, deactivating the particular role for the session without having to establish a new session for the particular user;
wherein deactivating the particular role for the session comprises modifying particular role data representing the particular role to reflect that the particular role is currently not effective for the particular user.

36. The non-transitory computer-readable storage medium of claim 35, wherein the role data is ordered according to role end dates for each of the plurality of roles and role end dates are determined based, at least in part, on a date constraint applicable to the respective role.

37. The non-transitory computer-readable storage medium of claim 35, wherein the start date, the end date, and the current date each indicate a date and a time.

38. The non-transitory computer-readable storage medium of claim 35, wherein establishing the session for the user includes:
obtaining, from a database, data that represents the role, the start date, and the end date; and
storing the data in a computer memory.

39. A non-transitory computer-readable storage medium storing instructions, which when executed by one or more processors of one or more computing devices, cause:
storing, in a first data structure, role data which represents a plurality of roles assigned to a plurality of users;
storing, in a second data structure, access control data which specifies one or more privileges required to perform one or more operations on a plurality of data objects and one or more roles which are granted the one or more privileges;

storing data that represents an effective date constraint on a grant of a senior role of a plurality of roles in a role hierarchy to a grantee, the effective date constraint having a start date and an end date;

wherein for each role of said plurality of roles:
respective privileges to perform operations are assigned to said each role;
wherein the respective privileges of said each role are acquired by a user based at least on assignment of said each role to said user;

prior to the start date, establishing a session for a particular user;
storing, in a third data structure, role data which represents one or more active roles for the particular user;

during the session and after the start date:
receiving a request to perform an operation on a protected object on behalf of the particular user, wherein, prior to receiving the request, a junior role is not active for the session;
wherein the senior role is assigned privileges to perform one or more operations on a plurality of data objects;
wherein the senior role is assigned to a plurality of users determining whether the junior role that is a junior role of the senior role is currently effective for the session based at least in part on a comparison of a current date to the start date of the effective date constraint on a grant of the senior role to the grantee, wherein the senior role inherits at least one privilege granted to the junior role, said junior role belonging to said plurality of roles;

in response to determining that the junior role is currently effective for the session, activating the junior role for the session such that the user acquires a privilege associated with the junior role without having to establish a new session for the user.

40. The non-transitory computer-readable storage medium of claim 39, wherein the grantee is another role.

41. The non-transitory computer-readable storage medium of claim 39, wherein the grantee is a user.

42. The non-transitory computer-readable storage medium of claim 39, wherein the start date, the end date, and the current date each indicate a date and a time.

* * * * *

UNITED STATES PATENT AND TRADEMARK OFFICE
CERTIFICATE OF CORRECTION

PATENT NO. : 9,477,671 B2  
APPLICATION NO. : 12/473164  
DATED : October 25, 2016  
INVENTOR(S) : Bhatti et al.

Page 1 of 1

It is certified that error appears in the above-identified patent and that said Letters Patent is hereby corrected as shown below:

On page 2, Column 2, under Other Publications, Line 18, delete "Institue" and insert -- Institute --, therefor.

In Column 12, Line 51, delete "2007; and" and insert -- 2007. --, therefor.

In Column 16, Line 10, delete "decativate" and insert -- deactivate --, therefor.

In Column 18, Line 34, delete "less then" and insert -- less than --, therefor.

In Column 18, Line 44, delete "less then" and insert -- less than --, therefor.

In Column 24, Lines 29-30, in Claim 18, delete "a a" and insert -- a --, therefor.

In Column 28, Line 2, in Claim 39, after "users" insert -- ; --.

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*